US012788667B2

(12) United States Patent
Whitmore et al.

(10) Patent No.: US 12,788,667 B2
(45) Date of Patent: Nov. 10, 2026

(54) ROLLATOR

(71) Applicant: Drive DeVilbiss Healthcare, Port Washington, NY (US)

(72) Inventors: Olivia Whitmore, Newcastle-under-Lyme (GB); Samuel Thompson, Wensley (GB); Benjamin Ambrose, Wetherby (GB); Jordan Martin, Greetland (GB); Elizabeth Natale, Littleton, CO (US)

(73) Assignee: Medical Depot, Inc., Port Washington, NY (US)

( * ) Notice: Subject to any disclaimer, the term of this patent is extended or adjusted under 35 U.S.C. 154(b) by 426 days.

(21) Appl. No.: 18/451,496

(22) Filed: Aug. 17, 2023

(65) Prior Publication Data

US 2023/0398032 A1 Dec. 14, 2023

Related U.S. Application Data

(60) Division of application No. 18/069,774, filed on Dec. 21, 2022, now Pat. No. 11,766,378, which is a continuation of application No. 17/176,590, filed on Feb. 16, 2021, now Pat. No. 11,559,459.

(51) Int. Cl.
*A61H 3/04* (2006.01)

(52) U.S. Cl.
CPC ......... *A61H 3/04* (2013.01); *A61H 2003/046* (2013.01); *A61H 2201/0161* (2013.01)

(58) Field of Classification Search
CPC .......................... A61H 3/04; A61H 2201/0161
See application file for complete search history.

(56) References Cited

U.S. PATENT DOCUMENTS

| | | | | |
|---|---|---|---|---|
| 1,162,158 A | | 11/1915 | Haaker | |
| 1,391,846 A | * | 9/1921 | Nienaber | B60C 7/24 156/92 |
| 1,638,810 A | * | 8/1927 | Klaus | B60C 7/24 152/394 |
| 1,743,688 A | * | 1/1930 | Schoff | B60C 7/24 152/394 |
| 3,877,505 A | | 4/1975 | Besuden et al. | |
| 4,289,186 A | * | 9/1981 | Wilde | B60C 15/02 152/385 |
| 4,393,913 A | * | 7/1983 | Grawey | B60C 15/0226 152/395 |
| 4,869,279 A | | 9/1989 | Hedges | |
| 5,275,473 A | | 1/1994 | Hicks | |

(Continued)

FOREIGN PATENT DOCUMENTS

| | | |
|---|---|---|
| CA | 2594566 A1 | 1/2009 |
| CA | 2837594 A1 | 6/2015 |

(Continued)

OTHER PUBLICATIONS

International Search Report and Written Opinion dated Mar. 2, 2022, issued in corresponding international application No. PCT/US2021/059639, 11 pages.

(Continued)

*Primary Examiner* — Erez Gurari
(74) *Attorney, Agent, or Firm* — Bradley J. Shelowitz

(57) ABSTRACT

A rollator includes a collapsible frame supported on a plurality of wheels, a pair of handlebars, and a braking mechanism.

6 Claims, 9 Drawing Sheets

(56) References Cited

U.S. PATENT DOCUMENTS 5,284,350 A 2/1994 Geiger et al.
5,328,183 A 7/1994 Counts
5,358,204 A 10/1994 Terada
5,533,793 A 7/1996 Walker
5,984,245 A 11/1999 Hsu
6,050,582 A 4/2000 Horacek
6,241,275 B1 6/2001 Slagerman
6,244,316 B1 * 6/2001 Naedler ............ B60C 23/00345 152/417
6,250,722 B1 * 6/2001 Radke ..................... B60B 11/06 301/36.1
6,357,502 B1 * 3/2002 Caretta ..................... B60C 5/22 152/550
6,367,823 B1 4/2002 Miyagi
6,463,825 B2 10/2002 Lee
6,563,035 B2 5/2003 Hsieh
6,817,451 B1 11/2004 Chen
D501,432 S 2/2005 Moller
6,923,416 B1 8/2005 Hsieh
7,368,647 B2 5/2008 Hsieh
7,384,058 B2 6/2008 Munsey et al.
7,410,179 B2 8/2008 Lonkvist
7,559,560 B2 7/2009 Li et al.
8,240,437 B2 8/2012 Liljedahl
8,517,399 B2 8/2013 Liu
8,544,516 B2 10/2013 Mariman et al.
8,578,984 B2 * 11/2013 Hannah ................... B60B 23/06 29/894.31
8,628,108 B2 1/2014 Gingras et al.
D699,634 S 2/2014 Wu
8,646,804 B2 * 2/2014 Derks .................. A61G 5/0825 280/87.01
8,708,363 B1 4/2014 Chang
8,840,125 B2 9/2014 Huang
8,998,223 B2 4/2015 Chang
D739,314 S 9/2015 Wang et al.
9,221,433 B2 12/2015 Dunlap
9,381,132 B2 7/2016 Chen
9,474,203 B2 10/2016 Anderson et al.
9,511,788 B1 * 12/2016 Kruppa ............... F16D 65/0056
9,643,454 B2 5/2017 Kumar et al.
9,687,411 B2 6/2017 Chen
9,731,562 B2 * 8/2017 Smith ....................... B60C 7/24
9,821,827 B2 11/2017 Kindberg
9,839,571 B2 12/2017 Pan
9,854,734 B2 1/2018 Phely et al.
9,877,889 B2 1/2018 Chen
D819,503 S 6/2018 Huang
10,064,782 B1 * 9/2018 Levi ......................... A61H 3/04
D836,499 S 12/2018 Delatorre et al.
D837,697 S 1/2019 Luo
D845,841 S 4/2019 No-Young
D865,575 S 11/2019 Lin
10,464,369 B1 * 11/2019 Samuels ................. B60C 17/00
10,485,724 B2 11/2019 Schaaper et al.
D869,347 S 12/2019 Huang
D874,351 S 2/2020 Fellingham et al.
10,555,866 B2 2/2020 Pan et al.
10,618,349 B2 * 4/2020 Johnson .................... B60B 3/08
10,667,967 B2 6/2020 Horacek
10,667,968 B2 6/2020 Ueda et al.
10,675,207 B2 6/2020 VanAusdall
D977,373 S * 2/2023 Li ................................ D12/130
11,779,506 B1 * 10/2023 Liu .......................... A61H 3/04 135/67
11,806,304 B1 * 11/2023 Turner ..................... A61H 3/04
11,850,207 B1 * 12/2023 Rasmussen .............. A61H 3/04
12,419,802 B1 * 9/2025 Burton ..................... A61H 3/04
2004/0021299 A1 2/2004 Tsai
2005/0077760 A1 4/2005 Smith
2005/0121566 A1 6/2005 Hennessey et al.
2006/0027298 A1 * 2/2006 Han .......................... B60B 1/02 152/400
2006/0070777 A1 * 4/2006 Ducharme ............... B62M 7/12 180/65.1
2006/0070785 A1 * 4/2006 Ducharme ............... B62M 7/12 180/220
2006/0071767 A1 * 4/2006 Johanning ............. B60C 19/003 340/447
2007/0267835 A1 11/2007 Huang
2012/0090926 A1 * 4/2012 Dunlap ................... B60T 1/005 188/68
2013/0061893 A1 * 3/2013 Nilsson ................ A61G 5/1091 280/647
2014/0305249 A1 * 10/2014 Liu .......................... G05G 1/04 74/491
2015/0173994 A1 * 6/2015 Chen ........................ A61H 3/00 280/639
2015/0245973 A1 * 9/2015 Liu .......................... A61H 3/04 280/47.34
2015/0351994 A1 * 12/2015 Nicholson ................ A61H 3/04 280/639
2016/0250095 A1 * 9/2016 Liu .......................... A61H 3/04 280/47.38
2018/0244107 A1 * 8/2018 Bonac ....................... B60C 7/24
2019/0143761 A1 * 5/2019 Ahouanto ............. B60B 25/045 152/379.3
2019/0298601 A1 * 10/2019 FitzPatrick ........... B62B 5/0485
2020/0016933 A1 1/2020 Knotowicz et al.
2020/0078258 A1 3/2020 Kanaya et al.
2020/0155408 A1 * 5/2020 Fathi ........................ A61H 1/00
2020/0315901 A1 * 10/2020 Fellingham .............. A61H 3/04
2020/0352816 A1 * 11/2020 Lu ............................ A61H 3/04
2021/0146771 A1 * 5/2021 Zhu ........................ B62M 11/16
2022/0003308 A1 1/2022 Verbridge
2022/0151860 A1 * 5/2022 Shugert ............ A63B 23/03541
2022/0211568 A1 * 7/2022 AlGhazi .................. A61H 3/04
2022/0257450 A1 * 8/2022 Whitmore ................ A61H 3/04
2025/0009576 A1 * 1/2025 Cha ...................... A61G 5/0833
2025/0009590 A1 * 1/2025 Cha .......................... A61H 3/04

FOREIGN PATENT DOCUMENTS

CN 210844117 U 6/2020
DE 8614849 U1 8/1986
DE 9218713 U1 4/1995
DE 102010031954 A1 1/2012
DE 202012100468 U1 3/2012
DE 202012100469 U1 3/2012
DE 202012100470 U1 3/2012
DE 202012103311 U1 9/2012
DE 102012000587 A1 7/2013
DE 202011110430 U1 12/2013
DE 202019101063 U1 4/2019
EP 1238824 A1 9/2002
EP 1824724 A2 8/2007
EP 1931295 A1 6/2008
EP 2140846 A1 1/2010
EP 2328536 A1 6/2011
EP 2520266 A1 11/2012
EP 2535033 A1 12/2012
EP 2878290 A1 6/2015
EP 3095431 A1 11/2016
EP 3487464 A1 5/2019
GB 2424213 A 9/2006
WO 2007007811 A1 1/2007
WO 2007043268 A1 4/2007
WO 2016038671 A1 3/2016
WO 2018052306 A1 3/2018
WO 2018056829 A1 3/2018
WO 2020006790 A1 1/2020
WO 2020067902 A1 4/2020
WO 2020067903 A1 4/2020

OTHER PUBLICATIONS

Constantin, Angely; U.S. Pat. No. 957,413A, granted May 10, 1910, 2 pages.
Connable, Frank L.; U.S. Pat. No. 812,165A, granted Feb. 6, 1906, 4 pages.

(56) References Cited

OTHER PUBLICATIONS

Grotz, Christian; U.S. Pat. No. 731,677A, granted Jun. 23, 1903, 3 pages.

* cited by examiner

ROLLATOR

CROSS-REFERENCE TO RELATED APPLICATION

The present application is a divisional application of U.S. patent application Ser. No. 18/069,774 filed on Dec. 21, 2022, which is a continuation application of U.S. patent application Ser. No. 17/176,590 filed on Feb. 16, 2021 (issued as U.S. Pat. No. 11,559,459 on Jan. 24, 2023), the entire contents of each of which being incorporated by reference herein.

BACKGROUND

The present disclosure relates to mobility aids, and more particularly, to rollators. Rollators facilitate an individual's ability to walk and be independently mobile by providing stabilization, support, and/or reducing the burden on the individual's lower body. A typical rollator includes a frame supported on three to four wheels, handlebars, and a seat. There is a continuing need for improving the usability, transportability, and/or convenience of use of rollators.

SUMMARY

In accordance with an aspect of the present disclosure, a rollator for aiding mobility of a user is provided and includes a left-side frame, a right-side frame coupled to the left-side frame, a seat supported between the left-side and right-side frames, a first handle assembly coupled to the left-side frame, a second handle assembly coupled to the right-side frame, a plurality of wheels supporting the left-side and right-side frames, and a braking mechanism operably coupled to the first or second handle assemblies. A first of the wheels includes a wheel hub having a lateral extension protruding from the wheel hub, and a tire disposed about the wheel hub. The braking mechanism includes a brake pad configured to selectively engage the first wheel to resist movement of the rollator along a surface.

In aspects, the tire of the first wheel may include a lateral extension protruding from the tire. The lateral extension of the tire may be disposed about the lateral extension of the wheel hub.

In aspects, the brake pad may be configured to selectively engage an outer peripheral surface of the lateral extension of the tire.

In aspects, the brake pad may be configured to selectively engage the outer peripheral surface of the lateral extension of the tire in response to an actuation of the braking mechanism.

In aspects, the lateral extension of the wheel hub may be a ring monolithically formed with the wheel hub, and the lateral extension of the tire may be a ring monolithically formed with the tire.

In aspects, the braking mechanism may further include a brake handle movably coupled to the first handle assembly, and a flexible elongate element extending between and coupling the brake handle and the brake pad. An actuation of the brake handle may move the brake pad between a first position and a second position. In the first position, the brake pad engages the first wheel. In the second position, the brake pad disengages the first wheel.

In aspects, the flexible elongate element may extend through the left-side frame.

In aspects, the brake pad may be resiliently biased toward the second position.

In aspects, the brake handle may be configured to be moved out of a neutral position and toward a first fixed position or a second fixed position. In the neutral position, the brake pad is disengaged from the first wheel. In the first fixed position, the brake pad applies a first force on the first wheel, and in the second fixed position, the brake pad applies a second force on the first wheel that is greater than the first force.

In aspects, the brake handle may be free to move relative to the first handle assembly when the brake handle is in the neutral position, and the brake handle may be resisted from moving relative to the first handle assembly when the brake handle is in the first or second fixed positions.

In aspects, the rollator may further include a folding mechanism interconnecting the left-side and right-side frames. The folding mechanism may be configured to transition the rollator between an expanded configuration and a collapsed configuration.

In aspects, the folding mechanism may include a pair of first and second cross bars pivotably coupled to one another. Each of the first and second cross bars may have a first end and a second end. The second end of the first cross bar may be pivotably coupled to the left-side frame and the second end of the second cross bar may be pivotably coupled to the right-side frame such that pivoting of the pair of first and second cross bars relative to one another adjusts a width defined between the left-side and right-side frames.

In aspects, the folding mechanism may further include a first elongated support coupled to the first end of the first cross bar, and a second elongated support coupled to the first end of the second cross bar. The first and second elongated supports may be together configured to support the seat thereon.

In aspects, the left-side frame may have a tab extending inwardly therefrom configured to support the first elongated support when the folding mechanism is in the expanded configuration. The right-side frame may have a tab extending inwardly therefrom configured to support the second elongated support when the folding mechanism is in the expanded configuration.

In aspects, the folding mechanism may further include a first cam linkage and a first surface feature. The first cam linkage may be pivotably coupled to the first end of the first cross bar and the left-side frame, and the first surface feature may extend from the first end of the first cross bar. The first surface feature may be configured to lockingly engage the first cam linkage when the folding mechanism is in the expanded configuration to selectively fix the folding mechanism in the expanded configuration.

In accordance with another aspect of the disclosure, a rollator for aiding mobility of a user is provided and includes a left-side frame, a right-side frame, a folding mechanism coupling the left-side and right-side frames to one another, a seat supported between the left-side and right-side frames, a plurality of wheels supporting the left-side and right-side frames, and a brake pad movably coupled to the left-side frame or the right-side frame. The folding mechanism is configured to adjust a width defined between the left-side and right-side frames. A first of the wheels includes a wheel hub having a lateral extension, and a tire disposed about the wheel hub. The tire has a lateral extension disposed about the lateral extension of the wheel hub, and the brake pad is configured to selectively engage an outer peripheral surface of the lateral extension of the tire to resist movement of the rollator along a surface.

In aspects, the rollator may further include a brake handle operably coupled to the brake pad. The brake pad may be configured to selectively engage the outer peripheral surface of the lateral extension of the tire in response to an actuation of the brake handle.

In aspects, the folding mechanism may further include a pair of first and second cross bars pivotably coupled to one another, a first elongated support, and a second elongated support. Each of the cross bars may have a first end and a second end. The second end of the first cross bar may be pivotably coupled to the left-side frame and the second end of the second cross bar may be pivotably coupled to the right-side frame such that pivoting of the pair of first and second cross bars relative to one another adjusts the width defined between the left-side and right-side frames. The first elongated support may be coupled to the first end of the first cross bar, and the second elongated support may be coupled to the first end of the second cross bar. The first and second elongated supports may together be configured to support the seat thereon.

As used herein, the terms parallel and perpendicular are understood to include relative configurations that are substantially parallel and substantially perpendicular up to about + or −15 degrees from true parallel and true perpendicular.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

BRIEF DESCRIPTION OF THE DRAWINGS

Embodiments of the present disclosure are described herein with reference to the accompanying drawings, wherein.

DETAILED DESCRIPTION

Figure 1A:
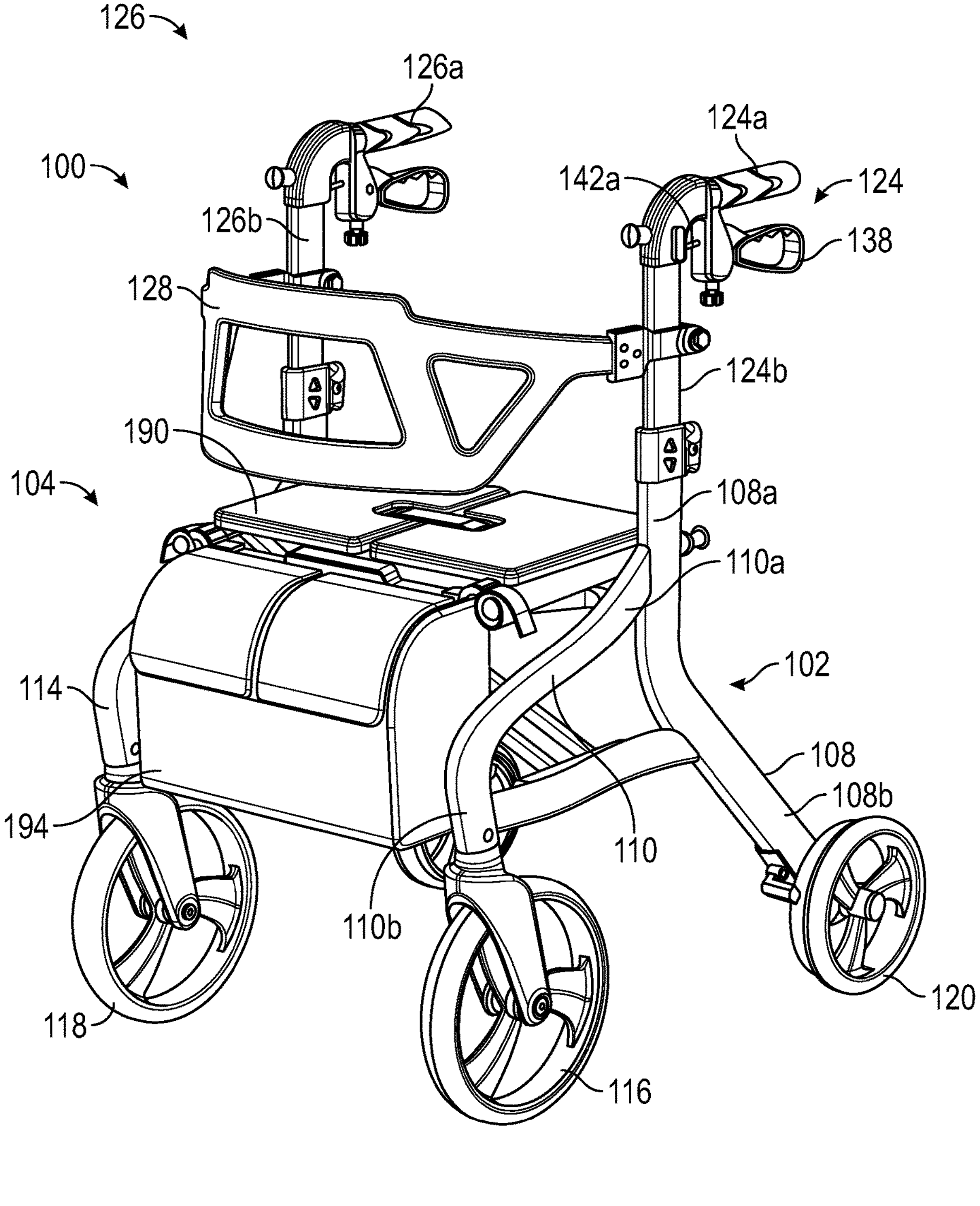
FIG. 1A is a front perspective view illustrating an exemplary embodiment of a rollator shown in an expanded or operational configuration.

Embodiments of the presently disclosed rollators are described in detail with reference to the drawings, in which like reference numerals designate identical or corresponding elements in each of the several views.

Figure 1B:
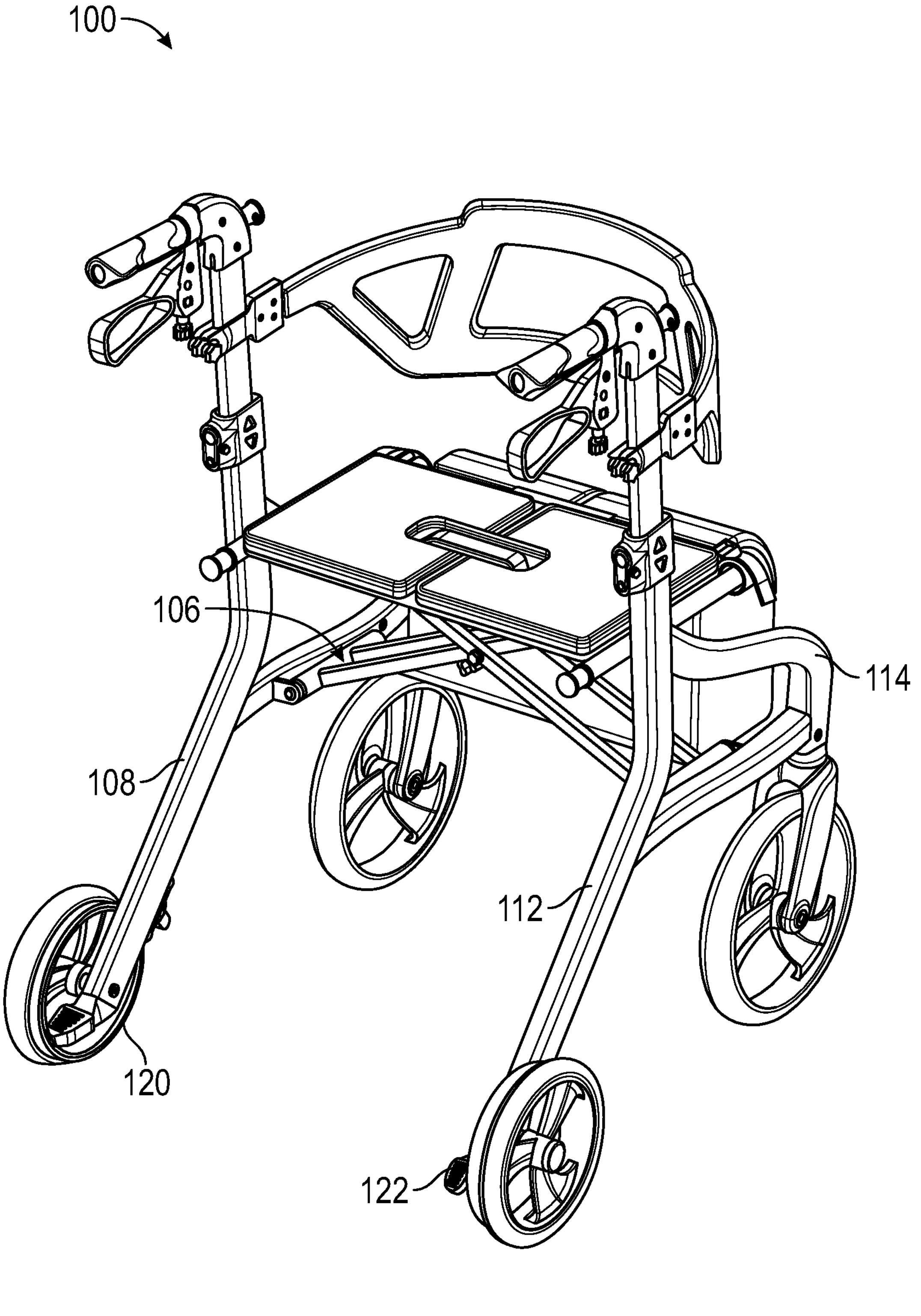
FIG. 1B is a rear perspective view of the rollator of FIG. 1A.
Figure 1C:
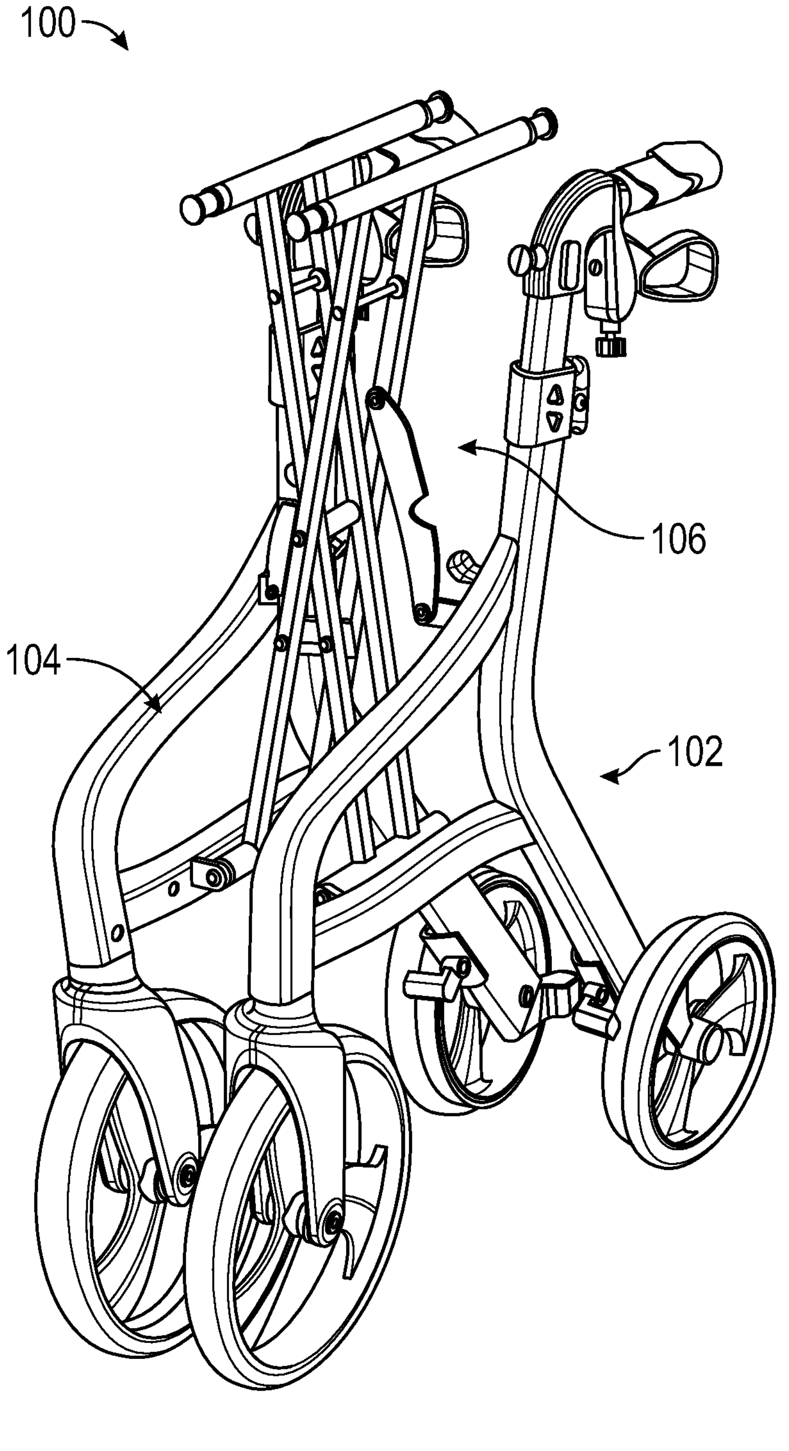
FIG. 1C is a front perspective view of the rollator of FIG. 1A shown in a collapsed or stored configuration.

With reference to FIGS. 1A-1C, an exemplary embodiment of a rollator is illustrated and is generally designated 100. The rollator 100 generally includes a left-side frame 102, and a right-side frame 104 coupled to the left-side frame 102 by a folding mechanism 106 that selectively transitions the rollator 100 between an expanded or operational configuration (FIGS. 1A-1B) and a collapsed or stored configuration (FIG. 1C). Each of the left-side and right-side frames 102, 104 includes a rear leg 108, 112 having an upper and lower end 108*a*, 108*b*, and a front leg 110, 114 having an upper end 110*a* fixed to the upper end 108*a* of the rear leg 108, and a lower end 110*b*. The lower end 110*b* of each of the front legs 110, 114 has a wheel or wheel assembly 116, 118 rotatably coupled thereto, and the lower end 108*b* of each of the rear legs 108, 112 has a wheel 120, 122 coupled thereto.

The rollator 100 further includes a first or left handle assembly 124 coupled to the left-side frame 102 and a second or right handle assembly 126 coupled to the right-side frame 104. Each of the handle assemblies 124, 126 includes a shaft 124*b*, 126*b* and a handlebar 124*a*, 126*a* extending rearwardly of the shaft 124*b*. The shafts 124*b*, 126*b* of the handle assemblies 124, 126 are slidably received in the upper end 108*a* of the rear leg 108, 112 of the respective left-side and right-side frames 102, 104 to allow for a selective adjustment of the height of the handlebars 124*a*, 126*a* relative to the frames 102, 104. A back support 128 may be attached to the shafts 124*b*, 126*b* of the handle assemblies 124, 126 and extends frontwardly therefrom. It is contemplated that the back support 128 may be coupled to other suitable locations of the rollator 100.

Figure 2:
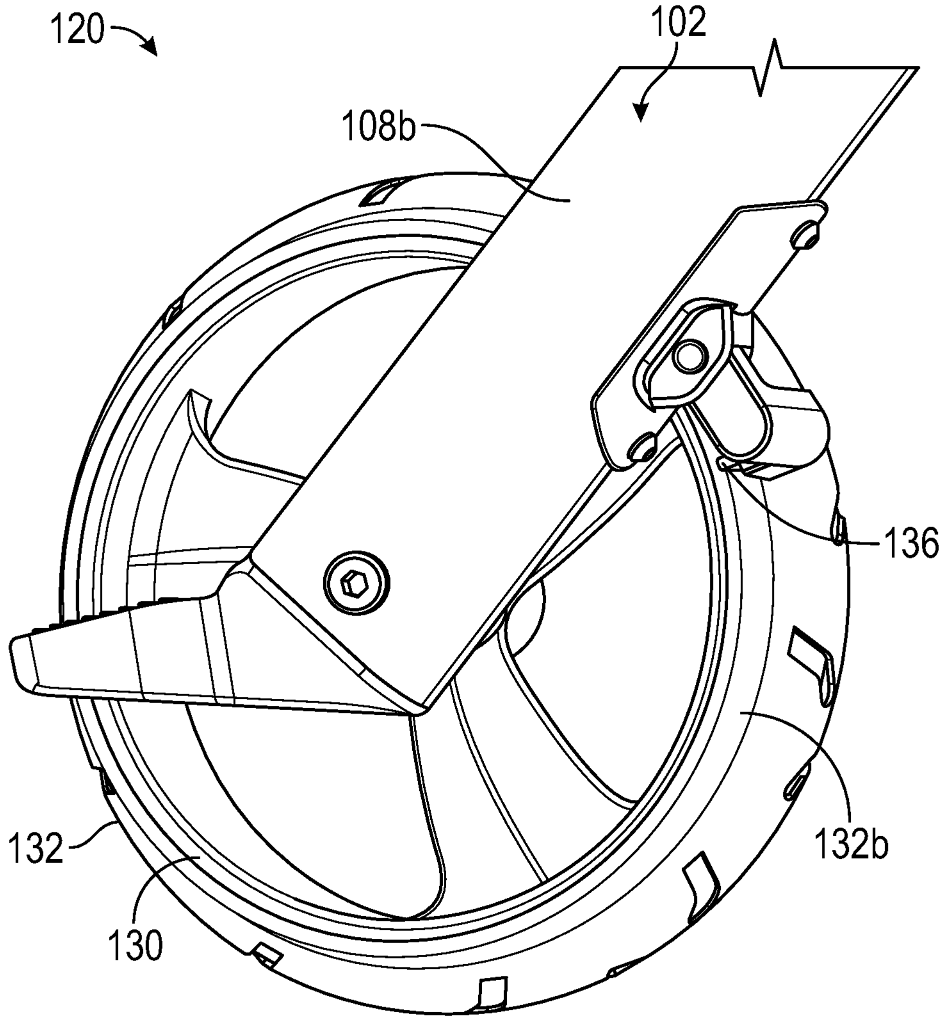
FIG. 2 is a perspective view illustrating a brake pad engaged to a wheel of the rollator of FIG. 1.
Figure 3:
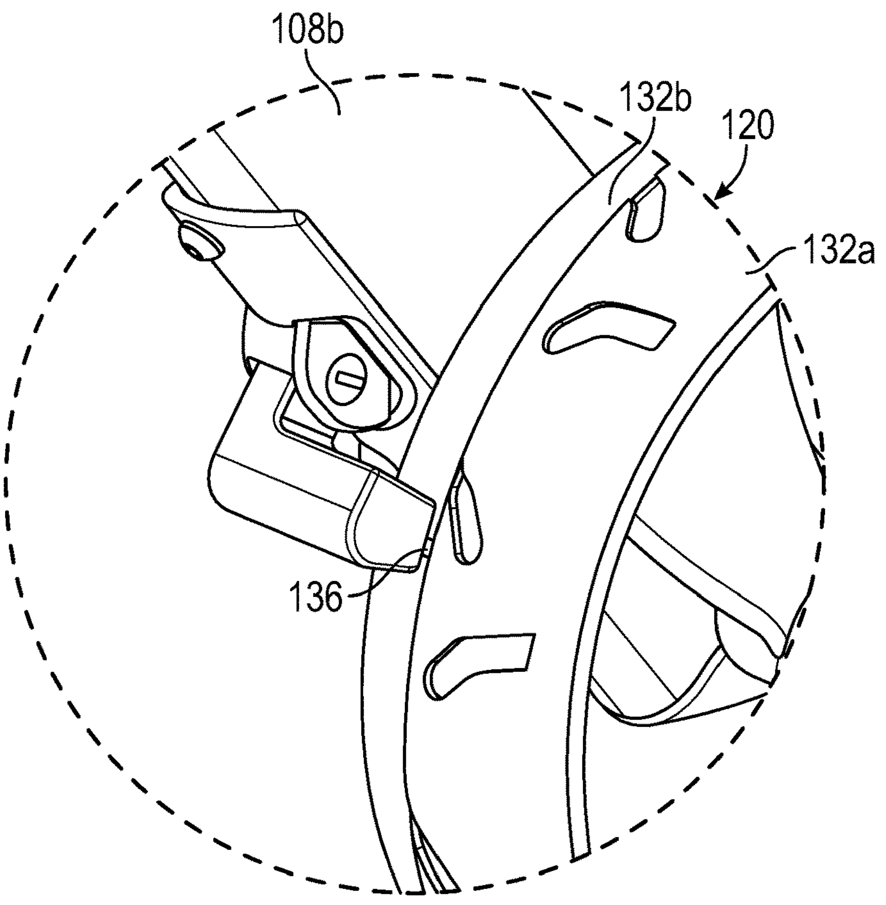
FIG. 3 is an enlarged perspective view illustrating the brake pad of FIG. 2 engaged to the wheel.
Figure 4:
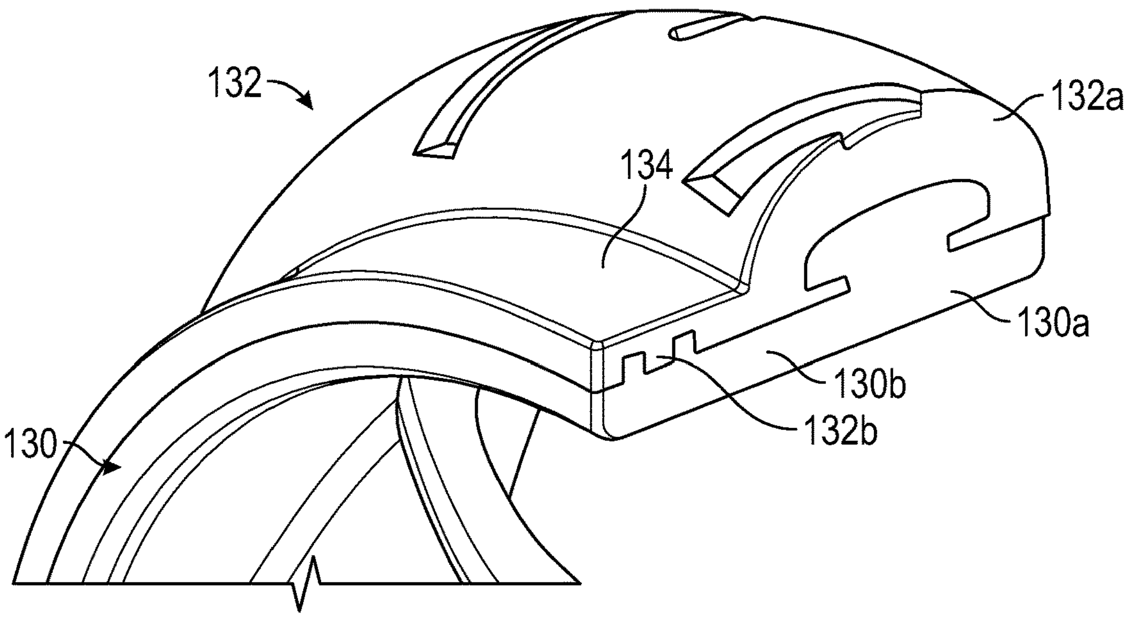
FIG. 4 is a cross-sectional view of the wheel including a wheel hub and a tire disposed about the wheel hub.
Figure 5:
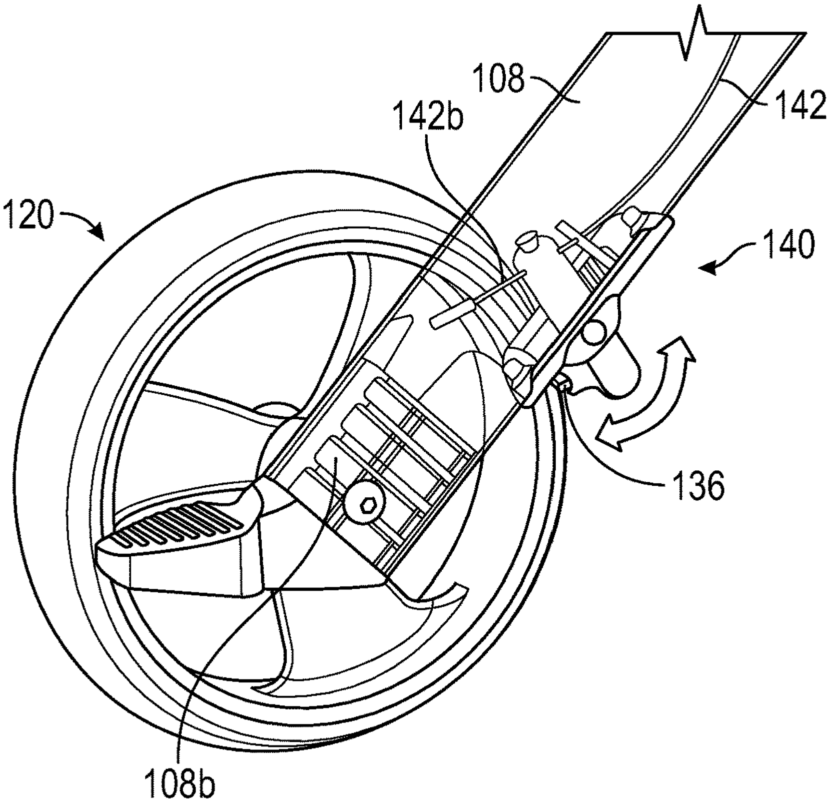
FIG. 5 is a perspective view illustrating details of a braking mechanism including the brake pad of FIG. 2 engaged to a frame and the wheel of the rollator.
Figure 6:
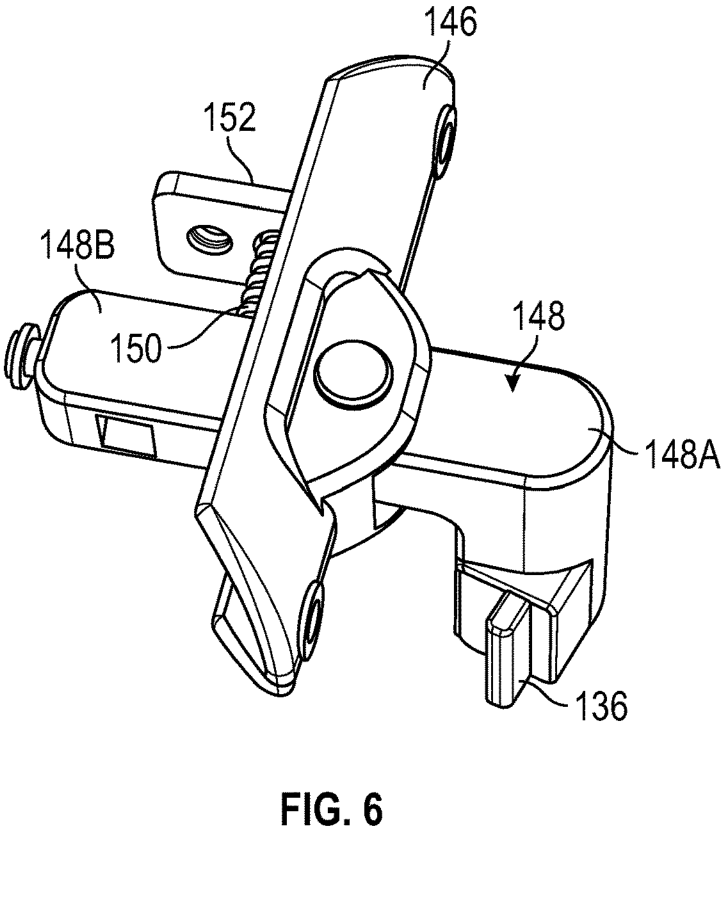
FIG. 6 is a perspective view illustrating the details of the braking mechanism in isolation.
Figure 7:
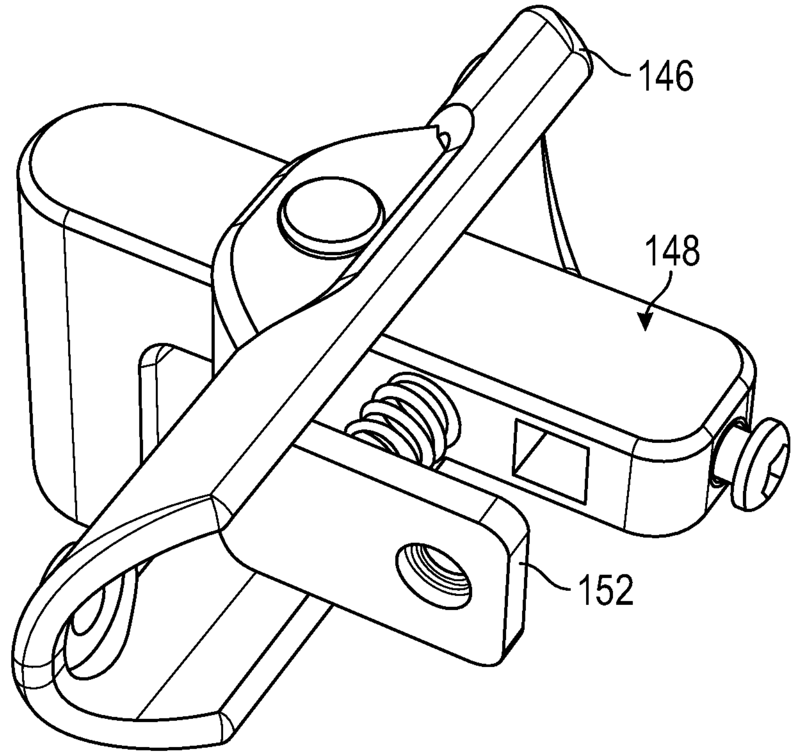
FIG. 7 is another perspective view illustrating the details of the braking mechanism in isolation.

With reference to FIGS. 2-4, one or more of the wheels 116, 118, 120, 122, such as the left-rear wheel 120, includes a wheel hub 130, and a tire 132 fixed about the wheel hub 130 to prevent rotation of the tire 132 relative to the wheel hub 130. In aspects, the wheel hub 130 may be fabricated from a relatively rigid plastic, such as, for example, PVC or glass-filled nylon, and the tire 132 may be fabricated from a more compliant material, such as, for example, rubber, PU, or PVC. In aspects, the tire 132 may be overmolded to the outer periphery of the wheel hub 130. The wheel hub 130 has an annular main body 130*a* and a ring or lateral extension 130*b* protruding laterally inward from the main body 130*a*. The tire 132 has an annular main body 132*a* and a ring or lateral extension 132*b* protruding laterally inward from the main body 132*a* of the tire 132. In aspects, the entire wheel hub 130 may be monolithically formed and the entire tire 132 may be monolithically formed. The main body 132*a* of the tire 132 surrounds the main body 130*a* of the wheel hub 130, and the ring 132*b* of the tire 132 surrounds the ring 130*b* of the wheel hub 130.

The rim 132*b* of the tire 132 has an outer peripheral surface 134 configured to be engaged by a brake pad 136 of the rollator 100 to resist movement of the rollator 100 along a surface (e.g., the ground). Due to the brake pad 136 being configured to engage the outer peripheral surface 134 of the ring 132*b* of the tire 132 rather than the ground-engaging main body 132*a* of the tire 132, wearing and/or tearing of the ground-engaging main body 132*a* of the tire 132 is prevented. Further, in some instances, the ground-engaging outer surface of the tire 132 may have debris or liquid thereon, which may reduce the frictional engagement between the brake pad 136 and the tire 132. As such, having the brake pad 136 engage the ring 132*b* of the tire 132 improves braking functionality.

With reference to FIGS. 5-8, the rollator 100 includes a braking mechanism 140 coupled to the rear leg 108 of the left-side frame 102 and includes the brake pad 136, a brake handle 138 (FIG. 8), and a flexible longitudinal element 142, such as, for example, a brake cable interconnecting the brake pad 136 and the brake handle 138. In aspects, the braking mechanism 140 may be coupled to the front leg 110, 114 of either of the left-side or right-side frames 102, 104. In aspects, the rollator 100 may include a second braking mechanism coupled to the right-side frame 104.

The braking mechanism 140 further includes a bracket 146 fixed to an outside of the lower end 108*b* of the left-rear leg 108, a pivot bar 148, and a biasing member 150. The pivot bar 148 extends transversely through the bracket 146 and the lower end 108*b* of the left-rear leg 108 and is pivotably supported by the bracket 146. The pivot bar 148 has a first end portion 148*a* extending outside of the frame 102 and a second end portion 148*b* disposed within the frame 102. The brake pad 136 may be configured as an angled tooth supported on the first end portion 148*a* of the pivot bar 148. In other aspects, the brake pad 136 may be configured as an elongated rubber pad (e.g., having a substantially flat or arcuate tire-engaging surface extending substantially the entire width of the rim 132*b* of the tire 132) configured to compress upon engaging the wheel 120. The biasing member 150 may be a coil spring disposed between the second end portion 148*b* of the pivot bar 148 and a plate 152 and resiliently biases the pivot bar 148 toward a horizontal position, in which the brake pad 136 is spaced from the wheel 120. In aspects, the brake pad 136 may be constructed of any suitable material including the same material as the tire 132, such as, for example, rubber, plastic, or metal, and may have any suitable shape, such as, for example, circular, flat, squared, triangular, etc.

The brake cable 142 has an upper end 142*a* (FIG. 8) fixed to the brake handle 138, and a lower end 142*b* (FIG. 5) fixed to the second end portion 148*b* of the pivot bar. As such, the pivot bar 148 is configured to pivot in response to an actuation of the brake handle 138 to move the brake pad 136 into and out of engagement with the wheel 120.

Figure 8:
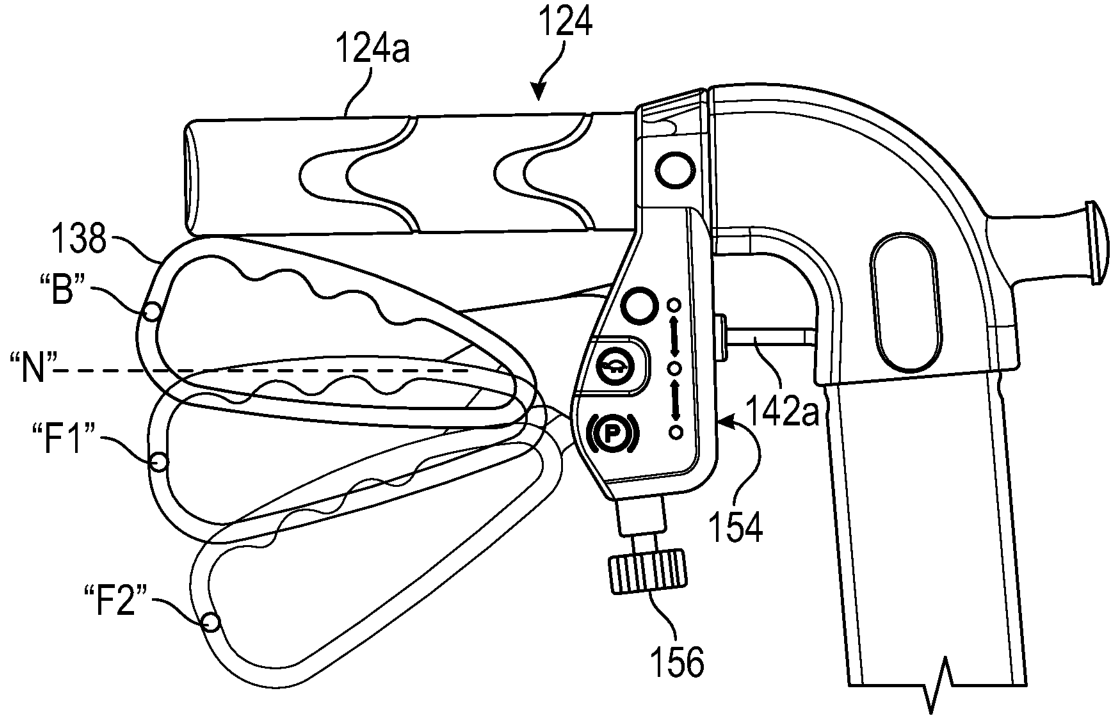
FIG. 8 is a rear view illustrating a brake handle of the rollator of FIG. 1 shown in a plurality of positions.

With reference to FIG. 8, the brake handle 138 is disposed beneath the handlebar 124*a* and is pivotably coupled to a flange 154 of the left handle assembly 124 that extends perpendicularly downward relative to the handlebar 124*a*. The brake handle 138 is pivotably coupled to and received within the flange 154. Since the upper end 142*a* of the brake cable 142 is routed into and fixed to the brake handle 138, either a downward or upward actuation of the brake handle 138 results in the pulling of the brake cable 142 in an upward direction to actuate the brake pad 136.

The brake handle 138 is supported in the flange 154 in a neutral position "N" and is configured to be moved out of the neutral position "N" to a braking position "B." In the neutral position "N," the brake pad 136 (FIG. 5) is disengaged from the first wheel 120 and the brake handle 138 is free to be pivoted relative to the flange 154 toward the braking position "B" during which the brake pad 136 is moved into engagement with the wheel 120. It is contemplated that due to the resilient bias of the biasing member 150 (FIG. 6) of the braking mechanism 140, when a user releases the brake handle 138 the brake handle 138 returns to the neutral position "N."

A user has the option of moving the brake handle 138 out of the neutral position "N" and into a first fixed position "F1" or a second fixed position "F2." To move the brake handle 138 out of the neutral position "N" to the first fixed position "F1," the brake handle 138 is moved downward until a detent (not shown, e.g., a tongue) on an end of the brake handle 138 engages a corresponding detent (not shown, e.g., a groove) in the flange 154 to selectively fix the brake handle 138 in the first fixed position "F1." In the first fixed position "F1," the brake pad 136 applies a first force on the first wheel 120 sufficient to provide a low resistance to rotation of the wheel 120 to allow for a slow movement of the rollator 100 along a surface. To move the brake handle 138 into the second fixed position "F1," the brake handle 138 is moved further downward from the first fixed position "F1" until another detent (not shown) on the brake handle 138 engages the detent in the flange 154 to selectively fix the brake handle 138 in the second fixed position "F2." In the second fixed position or park position "F2," the brake pad 136 applies a second force on the first wheel 120 that is greater than the first force sufficient to prevent rotation of the wheel 120. The flange 154 may include a brake adjustment knob 156 threadedly coupled to the flange 154 and fixed to the upper end 142*a* of the brake cable 142 such that a rotation of the knob 156 adjusts a tension in the brake cable 142.

Figure 9:
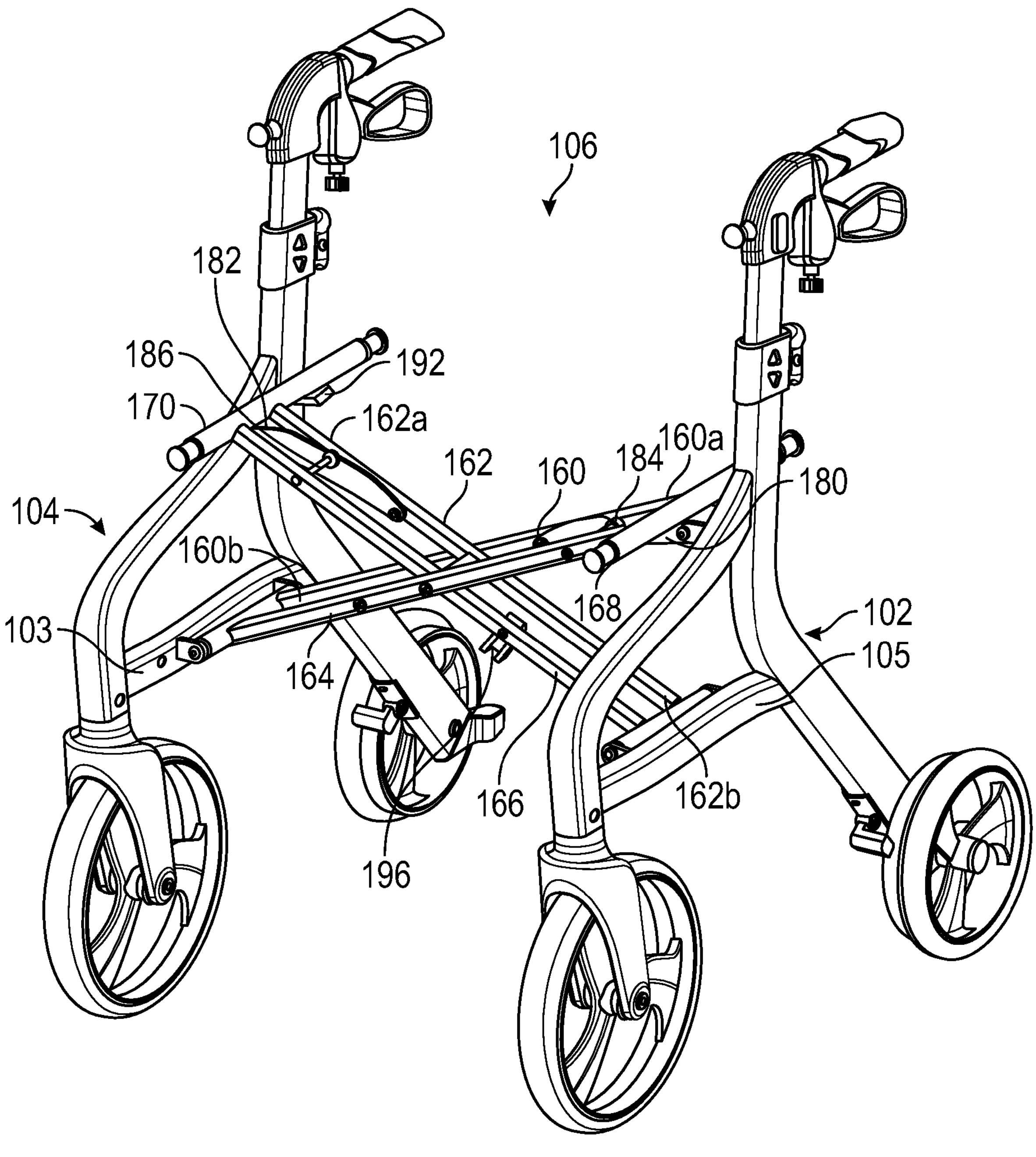
FIG. 9 is a front perspective view of the rollator of FIG. 1, with a seat removed, illustrating a folding mechanism of the rollator.
Figure 10A:
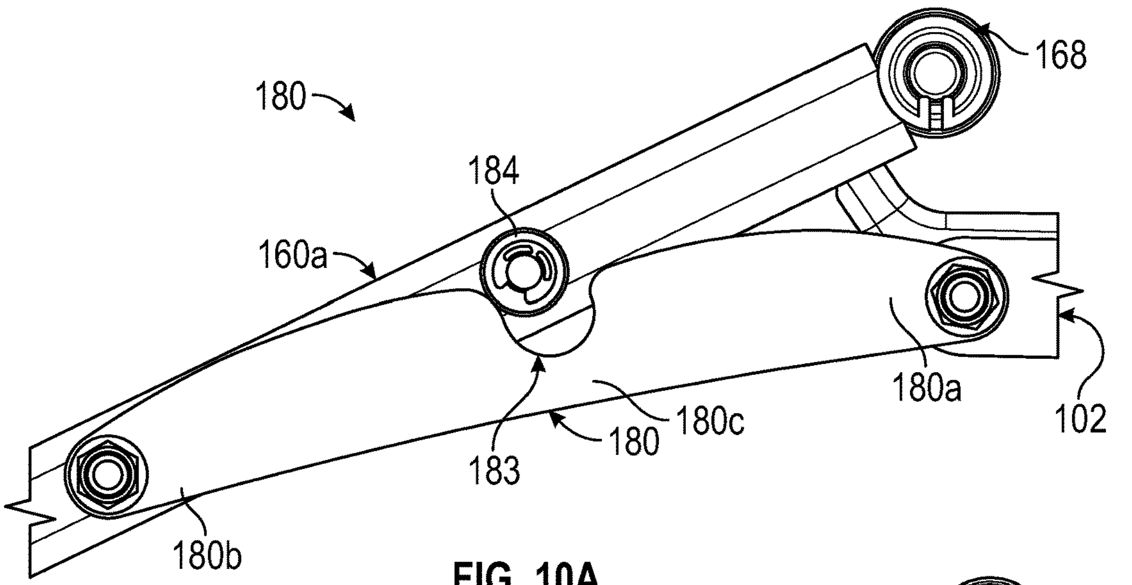
FIG. 10A is a front view illustrating a cam linkage of the folding mechanism in an unlocked state.
Figure 10B:
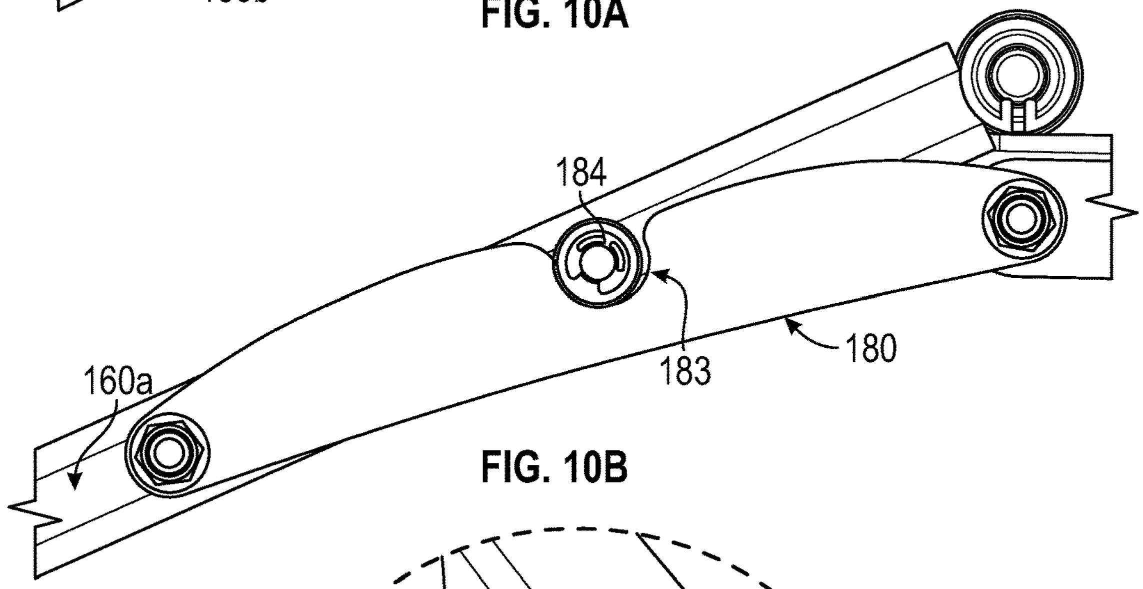
FIG. 10B is a front view illustrating the cam linkage of the folding mechanism locking the folding mechanism in the expanded configuration.

With reference to FIGS. 9, 10A, and 10B, the folding mechanism 106 interconnects the left-side and right-side frames 102, 104 and is configured to transition the rollator 100 between the expanded configuration and the collapsed configuration. The folding mechanism 106 includes a first pair of first and second cross bars 160, 162 pivotably coupled to one another, a second pair of third and fourth cross bars 164, 166 pivotably coupled to one another and longitudinally spaced from the first pair of first and second cross bars 160, 162, and first and second elongated seat supports 168, 170. The first pair of cross bars 160, 162 are pivotably coupled to the second pair of cross bars 164, 166 via a pivot pin extending through a central portion of each of the cross bars 160, 162, 164, 166. Since the first pair of cross bars 160, 162 are substantially similar or identical to the second pair of cross bars 164, 166, only details of the first pair of cross bars 160, 162 will be described.

Each of the first and second cross bars 160, 162 has a first end 160*a*, 162*a*, and a second end 160*b*, 162*b*. The first end 160*a*, 162*a* of the first and second cross bars 160, 162 are free to move relative to the frame 102, 104, whereas the second end 160*b* of the first cross bar 160 is pivotably coupled to a support bar 103 that spans between the rear and front legs 112, 114 of the right-side frame 104, and the second end 162*b* of the second cross bar 162 is pivotably coupled to a support bar 105 that spans between the rear and front legs 108, 110 of the left-side frame 102. As such, pivoting of the pair of first and second cross bars 160, 162 relative to one another adjusts a width defined between the left-side and right-side frames 102, 104.

The folding mechanism 106 further includes a first cam linkage 180 coupled to the left-side frame 102 and the first cross bar 160, a second cam linkage 182 coupled to the right-side frame 104 and the second cross bar 162, a first surface feature 184 (e.g., a roller, pin, or the like) extending from the first end 160*a* of the first cross bar 160, and a second surface feature 186 (e.g., a roller, pin, or the like) extending from the first end 162*a* of the second cross bar 162. The cam linkages 180, 182 may assume a generally arcuate configuration and the first cam linkage 180 has a first end 180*a* pivotably connected to the left-side frame 102, and a second end 180*b* pivotably connected to the first end 160*a* of the first cross bar 160*b*. The first cam linkage 180 further includes an intermediate portion 180*c* defining a notch 183 therein configured to lockingly engage the first surface feature 184 when the folding mechanism 106 is in the expanded configuration to selectively fix the folding mechanism 106 in the expanded configuration.

The first elongated seat support 168 of the folding mechanism 106 is fixed to the first end 160*a* of the first cross bar 160, and the second elongated support 170 is fixed to the first end 162*a* of the second cross bar 162. The first and second elongated seat supports 168, 170 have a foldable seat 190 (FIG. 1A) supported thereon. The elongated seat supports 168, 170 extend perpendicularly relative to the cross bars 160, 162 (e.g., parallel with a central longitudinal axis of the rollator 100). The left-side frame 102 has a tab (not explicitly shown) extending inwardly therefrom configured to support the first elongated seat support 168 when the folding mechanism 106 is in the expanded configuration, and the right-side frame 104 has a tab 192 (FIG. 9) extending inwardly therefrom configured to support the second elongated seat support 170 when the folding mechanism 106 is in the expanded configuration. It is contemplated that each of the elongated seat supports 168, 170 have opposing ends configured to detachably couple to a basket 194 or bag (FIG. 1A) such that the basket 194 may be attached to either the front or the rear of the rollator 100. In other aspects, the basket 194 may be attached to the front of the handle assemblies 124, 126.

Figure 11:
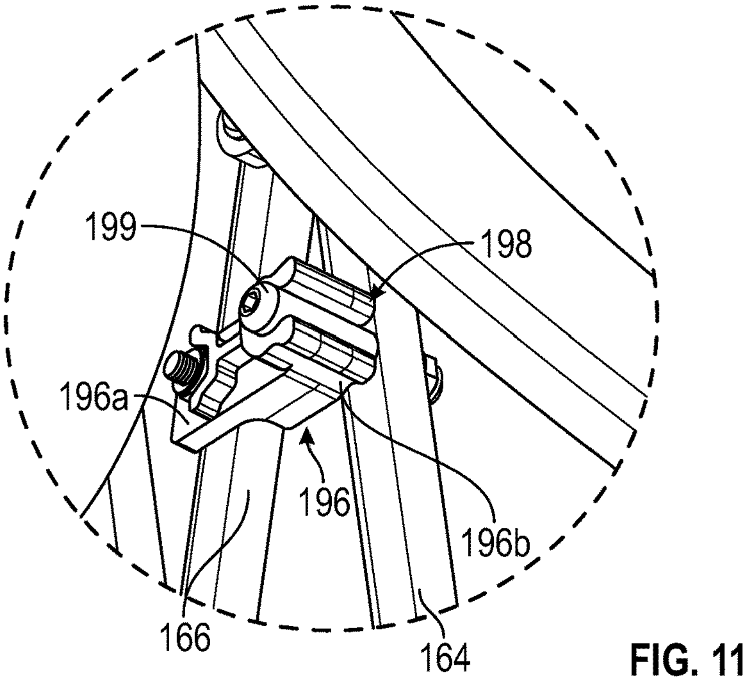
FIG. 11 is an enlarged view illustrating a bracket locking the folding mechanism of FIG. 9 in the collapsed configuration.

With reference to FIGS. 9 and 11, the folding mechanism 106 may further include a bracket 196 having a first end 196*a* fixed to the fourth cross bar 166 adjacent the intermediate portion thereof, and a second end 196*b* defining a C-shaped opening 198. The third cross bar 164 includes a pin 199 fixed to the intermediate portion thereof and configured for removable receipt in the C-shaped opening 198 of the bracket 196 when the folding mechanism 106 is in the collapsed configuration to selectively maintain the folding mechanism 106 in the collapsed configuration.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A rollator for aiding mobility of a user, the rollator comprising:
- a left-side frame;
- a right-side frame coupled to the left-side frame;
- a seat supported between the left-side and right-side frames;
- a first handle assembly coupled to the left-side frame, the first handle assembly including:
  - a first shaft extending upwardly from the left-side frame;
  - a first handlebar extending rearwardly from the first shaft; and
  - a first protrusion extending frontwardly from a portion of the first handle assembly;
- a second handle assembly coupled to the right-side frame, the second handle assembly including:
  - a second shaft extending upwardly from the right-side frame;
  - a second handlebar extending rearwardly from the second shaft; and
  - a second protrusion extending frontwardly from a portion of the second handle assembly;
- a first elongated seat support;
- a second elongated seat support, the first and second elongated seat supports supporting the seat thereon; and
- a bag configured to selectively detachably couple to:
  - the first and second protrusions of the respective first and second handle assemblies in a first state; and
  - the first and second elongated seat supports in a second state, wherein each of the first and second elongated seat supports includes a front end and a rear end, the bag being configured to detachably couple to the front end of each of the first and second elongated seat supports in the second state, and the rear end of each of the first and second elongated seat supports in a third state.

2. The rollator according to claim 1, further comprising a folding mechanism interconnecting the left-side and right-side frames, wherein the folding mechanism is configured to transition the rollator between an expanded configuration and a collapsed configuration.

3. The rollator according to claim 2, wherein the folding mechanism includes a pair of first and second cross bars pivotably coupled to one another and each having a first end, and a second end, the second end of the first cross bar being pivotably coupled to the left-side frame and the second end of the second cross bar being pivotably coupled to the right-side frame such that pivoting of the pair of first and second cross bars relative to one another adjusts a width defined between the left-side and right-side frames.

4. The rollator according to claim 3, wherein the folding mechanism includes the first elongated seat support and the second elongated seat support, the first elongated seat support being coupled to the first end of the first cross bar, and the second elongated seat support being coupled to the first end of the second cross bar.

5. The rollator according to claim 4, wherein the left-side frame has a tab extending inwardly therefrom configured to support the first elongated seat support when the folding mechanism is in the expanded configuration, and the right-side frame has a tab extending inwardly therefrom configured to support the second elongated seat support when the folding mechanism is in the expanded configuration.

6. The rollator according to claim 3, wherein the folding mechanism further includes:
- a first cam linkage pivotably coupled to the first end of the first cross bar and the left-side frame; and
- a first surface feature extending from the first end of the first cross bar and configured to lockingly engage the first cam linkage when the rollator is in the expanded configuration to selectively fix the rollator in the expanded configuration.

* * * * *